(12) United States Patent
Haslam et al.

(10) Patent No.: US 11,182,879 B1
(45) Date of Patent: Nov. 23, 2021

(54) SYNTHETIC BOKEH FOR VIDEO CONFERENCING

(71) Applicant: UIPCO, LLC, San Antonio, TX (US)

(72) Inventors: Justin Dax Haslam, San Antonio, TX (US); Donnette L. Moncrief Brown, San Antonio, TX (US); Eric David Schroeder, San Antonio, TX (US); Ravi Durairaj, San Antonio, TX (US); Deborah Janette Schulz, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/103,094

(22) Filed: Nov. 24, 2020

Related U.S. Application Data

(60) Provisional application No. 62/940,971, filed on Nov. 27, 2019.

(51) Int. Cl.
| | |
|---|---|
| *H04N 7/15* | (2006.01) |
| *G06T 5/00* | (2006.01) |
| *G06K 9/00* | (2006.01) |
| *H04R 1/08* | (2006.01) |
| *G08B 21/18* | (2006.01) |
| *H04N 7/14* | (2006.01) |

(52) U.S. Cl.
CPC .......... *G06T 5/002* (2013.01); *G06K 9/00288* (2013.01); *G08B 21/18* (2013.01); *H04N 7/142* (2013.01); *H04N 7/15* (2013.01); *H04R 1/08* (2013.01); *G06T 2207/10016* (2013.01); *G06T 2207/30196* (2013.01)

(58) Field of Classification Search
CPC ... G06T 5/00; G06K 9/00; H04R 1/08; G08B 21/18; H04N 7/15; H04N 7/14
USPC .......................................... 348/14.01–14.16
See application file for complete search history.

(56) References Cited

U.S. PATENT DOCUMENTS

| | | | |
|---|---|---|---|
| 10,638,090 B1 * | 4/2020 | Sculley | H04L 65/403 |
| 2008/0259154 A1 * | 10/2008 | Garrison | H04N 7/14 348/14.01 |
| 2013/0194375 A1 * | 8/2013 | Michrowski | H04N 5/23235 348/14.07 |
| 2014/0362163 A1 * | 12/2014 | Winterstein | G06T 5/002 348/14.07 |
| 2018/0365809 A1 * | 12/2018 | Cutler | G06T 7/50 |
| 2019/0156849 A1 * | 5/2019 | Feng | H04N 5/23219 |
| 2020/0226419 A1 * | 7/2020 | Knaan | H04N 5/247 |
| 2020/0267290 A1 * | 8/2020 | Solomon | G02B 27/0025 |

\* cited by examiner

*Primary Examiner* — Melur Ramakrishnaiah
(74) *Attorney, Agent, or Firm* — Plumsea Law Group, LLC

(57) ABSTRACT

A video system for creating a display in a video conference. The video system includes a web camera to capture an image of a user at a first distance from the web camera and a background that extends away from the camera at a second distance greater than the first distance. The video system also has a distance measuring system to measure the first distance between the user and the web camera. The video system establishes an artificial focal length at least as great as the first distance and less than the second distance to artificially blur the background while maintaining the user in focus. The display thus shows the user in focus and a blurred background. The purposefully-blurred background is known as synthetic bokeh.

20 Claims, 6 Drawing Sheets

US 11,182,879 B1

SYNTHETIC BOKEH FOR VIDEO CONFERENCING

CROSS-REFERENCE TO RELATED APPLICATIONS

This application claims the benefit of U.S. Provisional Patent Application Ser. No. 62/940,971, filed Nov. 27, 2019, for "Synthetic Bokeh for Video Conferencing", the entirety of which is hereby incorporated by reference.

BACKGROUND

1. Field of the Disclosure

The present disclosure relates to video displays. In particular, the disclosure relates to video conference displays.

2. Description of Related Art

Video conference displays are the visual portion of a video conference call, which also includes an audio portion. Video conferences often use web cameras, which typically have small apertures with poor optical properties that provide a long or deep depth of field, and a microphone. Video conference calls often are conducted from a conference room or a user's office. In such locations, the background may present a display including a cluttered and confusing image.

There is a need in the art for a system and method that improves the image in a video conference display.

SUMMARY OF THE DISCLOSURE

Because video conferences often take place at a user's work space or in a conference room that may have artwork or workspaces on the walls or may have a glass wall, a video conference display often is confusing and cluttered. Workspaces on the walls may display private or confidential information not intended to be disclosed in the video conference. The purposefully-blurred background is known as synthetic bokeh.

The disclosure relates to a system whereby a video conference display is clarified by keeping the user in focus while blurring the background. Thus, the system acts to reduce possible distractions during a video conference and thereby allows meetings to be conducted more efficiently. The system also increases security when the background includes private or confidential information. The system therefore maintains privacy of information and enables video conferences to be conducted securely.

The disclosure also reduces bandwidth of the video conference transmission. By doing the bokeh computation on the transmitting computer, the computer can determine which section of the image to transmit in full resolution. Blurred areas can be sent with a far lower resolution, as blurring need not be done at HD properties and characteristics. Thus, bandwidth is saved and transmission and reception of the video conference is more easily handled by slower connections.1

In one aspect, the disclosure provides a video system for creating a display in a video conference. The video system includes a web camera to capture an image of a user at a first distance from the web camera and a background that extends away from the camera at a second distance greater than the first distance. The video system also has a distance measuring system to measure the first distance between the user and the web camera. The video system establishes an artificial focal length at least as great as the first distance and less than the second distance to artificially blur the background while maintaining the user in focus. The display thus shows the user in focus and a blurred background.

In another aspect, the disclosure provides a system for creating a display in a video conference that further includes an augmented reality feature. The augmented reality feature is an augmented reality system that displays information for an electronic device. The augmented reality system for displaying information may be a whiteboard upon which the participants may write, or a display of an electronic screen generated by the user.

In yet another aspect, the disclosure provides a method for generating the video display.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Video conferencing is becoming an increasingly popular way of communicating with users who are not in the same location. Often, video conferences take place in a user's office or in a conference room. The background in such places often is cluttered with office equipment and wall hangings, and may include a glass wall and private information. Thus, the video display often is cluttered and the background detracts from the image of the user.

Figure 1:
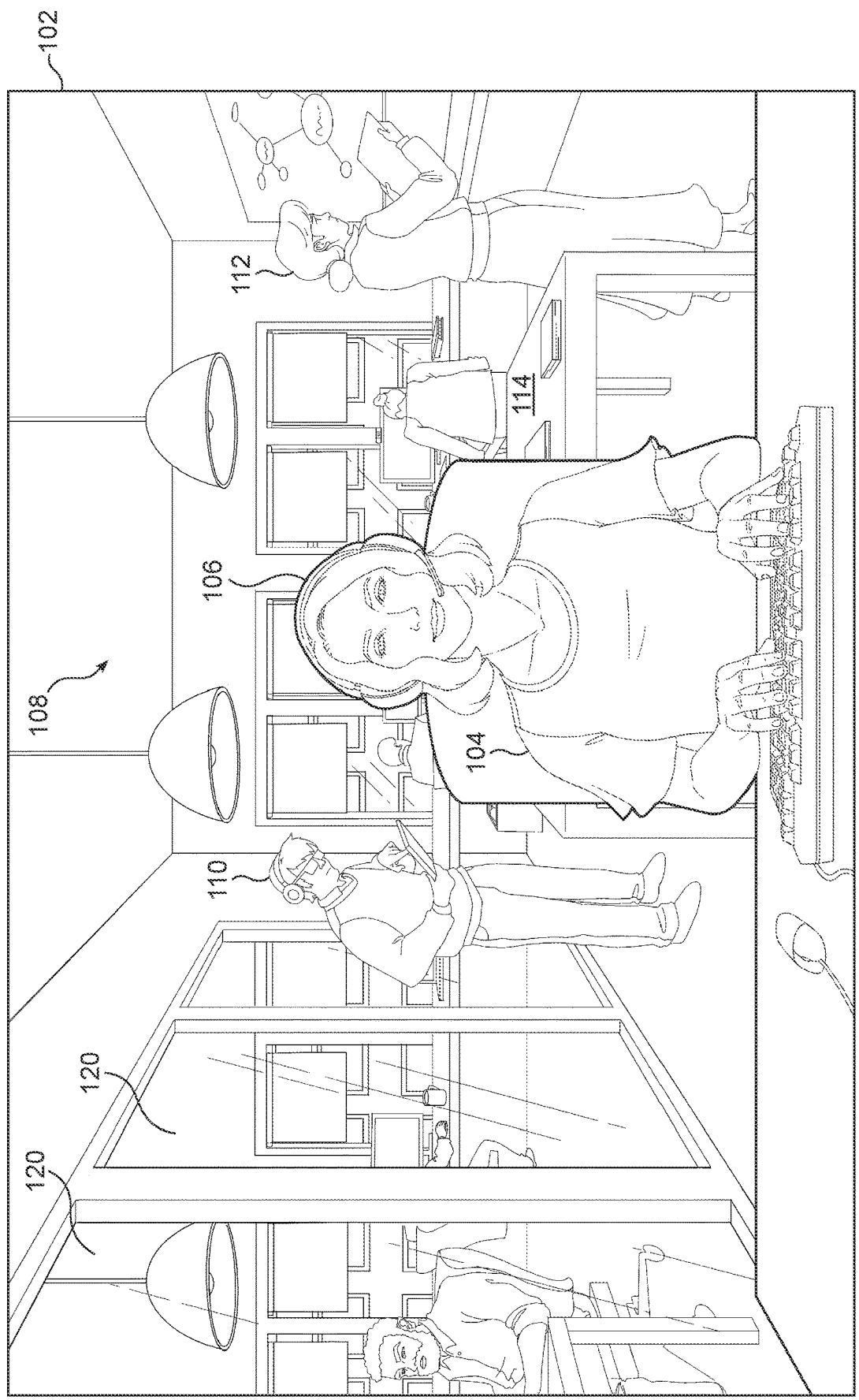
FIG. 1 illustrates a typical video conference display.

FIG. 1 illustrates a typical video conference display having a cluttered and distracting background. Web camera image 102 shows user 104 facing a web camera. Audio is supplied to a computer operating the web camera through headset 106. As can be seen, background 108 extends from behind user 104 away from the web camera. Background 108 is very cluttered, and includes people and objects seen in another room through glass wall 120. Background 108 also includes first employee 110, second employee 112, and office equipment 114.

Figure 2:
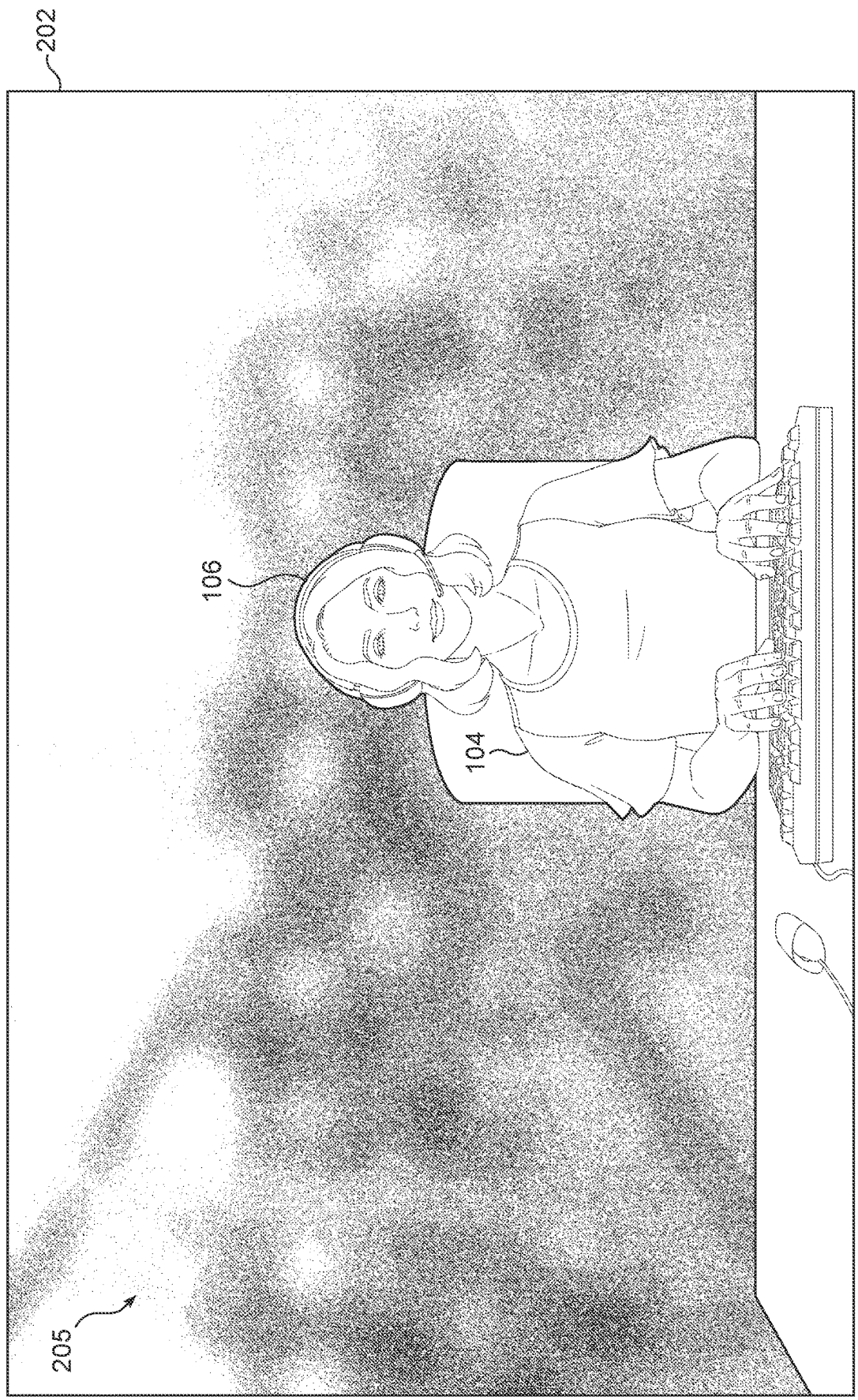
FIG. 2 illustrates a video conference display of an embodiment of the disclosure.

FIG. 2 illustrates an embodiment of the disclosure. Web camera image 202 illustrates user 104 facing a web camera and supplying audio to the computer, just as in web image 102. However, in an embodiment of the disclosure, background 205 has been blurred using methods described in further detail below. By blurring the background in a web camera image, the embodiment helps reduce the tendency of anyone viewing the web camera image to be distracted and miss information communicated by the user in the image.

Figure 3:
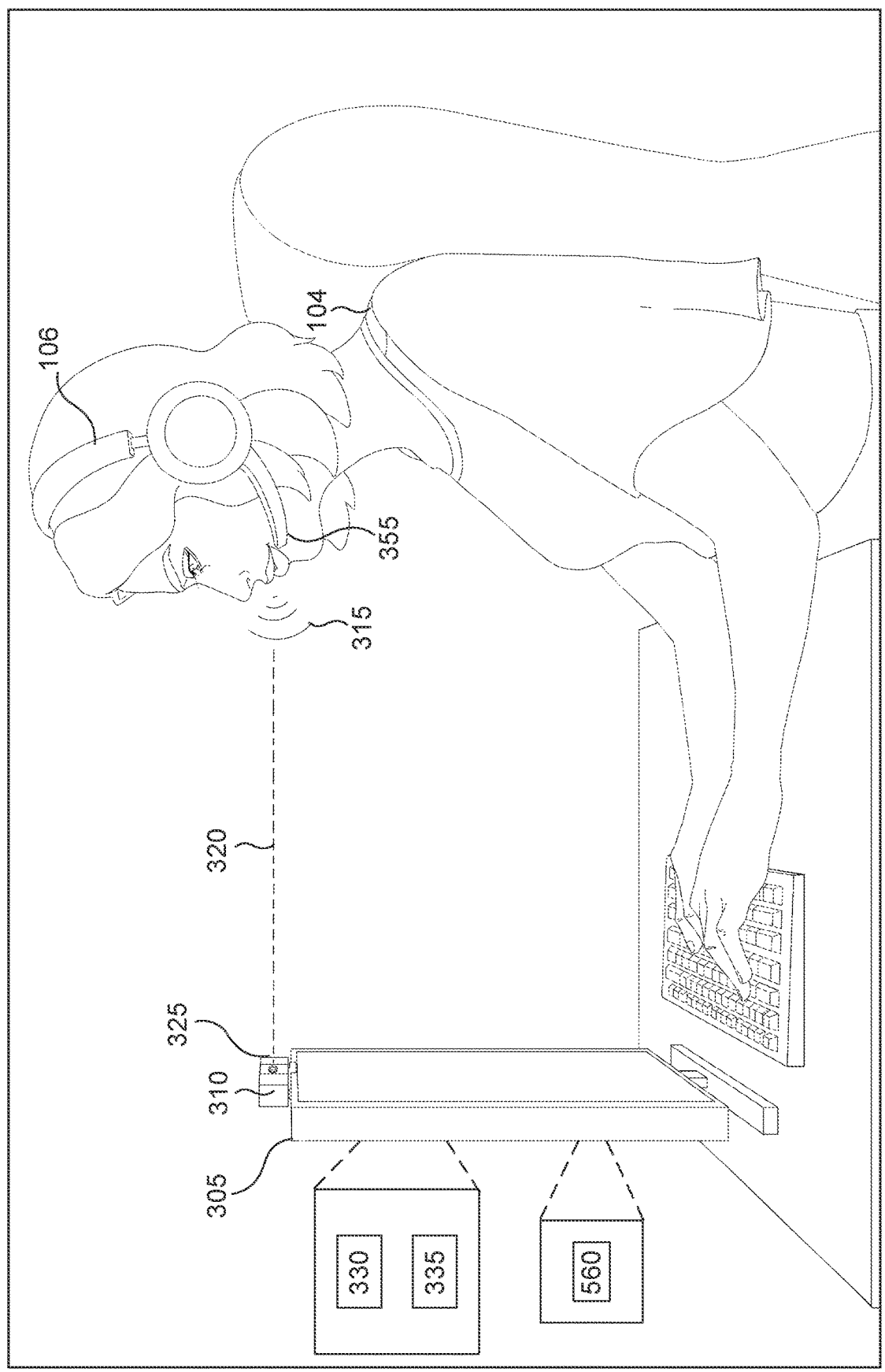
FIG. 3 illustrates an embodiment of the system of the disclosure.

FIG. 3 illustrates an embodiment of how a video system for creating a display in a video conference may be used to produce web camera image 202. Web camera 310 is electrically connected to computer 305 and may be controlled by computer 305. Typically, web camera 310 is connected to the internet through computer 305 for making a video conference call by using the internet to make an electrical connection to each user.

As can be seen in FIG. 3, user 104 is at a first distance 320 from web camera 310 associated with computer 305. In embodiments of the disclosure, computer 305 may use a timer as part of distance measuring system 330 to measure the time it takes for computer 305 to display an image of user 104 and may calculate the first distance 320. In such embodiments, computer 305 also may use a second timer as part of distance measuring system 330 to measure the time between a visual clue such as movement of the lips of user 104, the movement indicating that a sound 315 has been uttered and the time sound 315 is received at microphone 325.

As the skilled practitioner recognizes, the speed of light is about $3 \times 10^8$ m/sec; the speed of an electrical signal is about $2 \times 10^8$ m/sec; and the speed of sound is about $3.5 \times 10^2$ m/sec. As can be seen, the speed of light is about 6 orders of magnitude greater than the speed of sound. In view of the difference of 6 orders of magnitude between the speeds of the video and electrical signals and the audio signal, the time of the video signal travel can be ignored in the calculation of the first distance.

Figure 6:
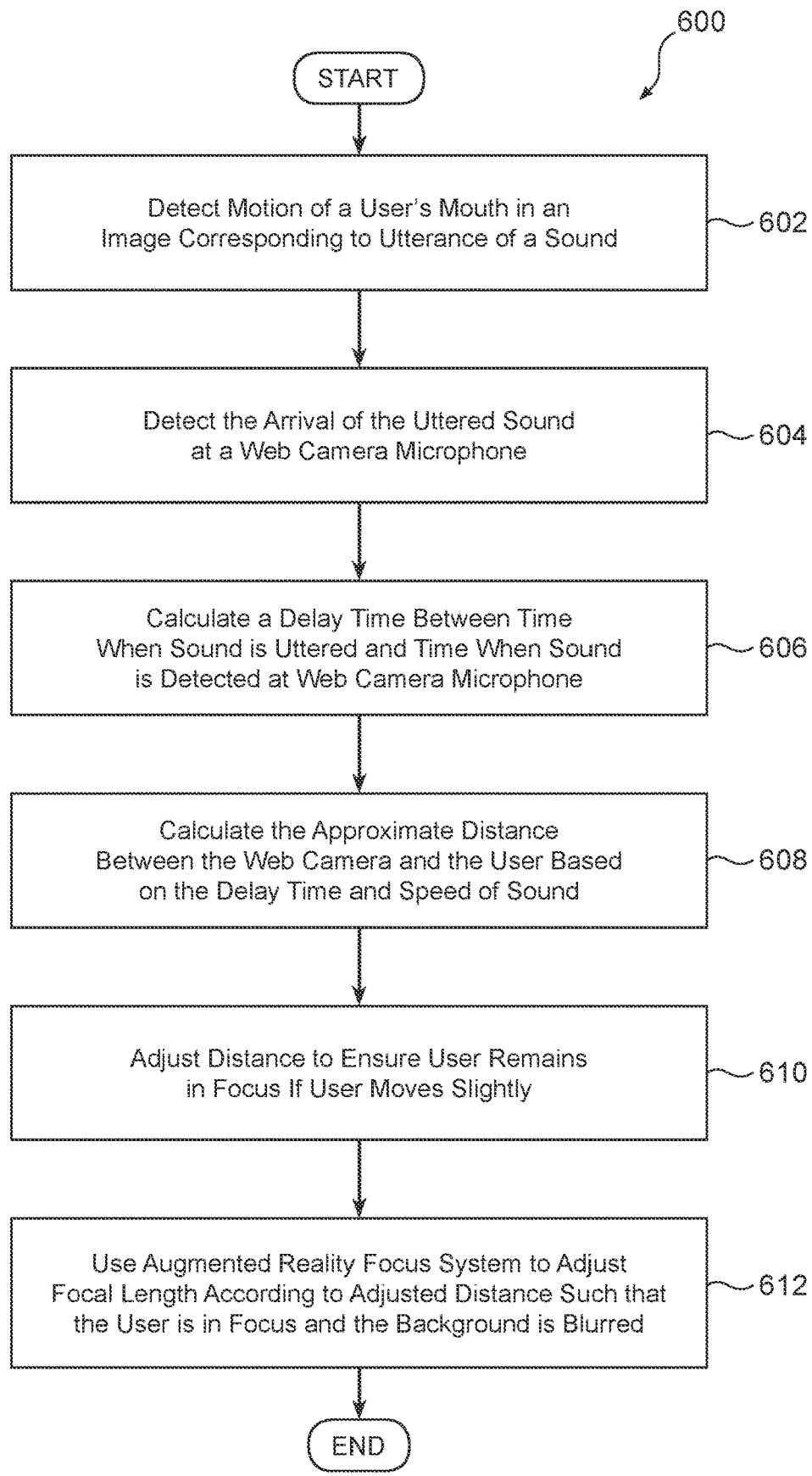
FIG. 6 is a flow chart of an embodiment of the disclosure.

FIG. 6 illustrates the steps for calculating a first distance of user 104 from web camera 310. As shown in process 600 for calculating a focal length, the first step 602 is to detect motion of user 104's mouth in an image that corresponds to utterance of a sound. In step 604, the arrival of the uttered sound at web camera microphone 325 is detected. Then, the delay time between the time when the sound is uttered and the time when the sound is detected at the web camera microphone 325 is calculated at step 606. The delay time then is used in step 608 to calculate first distance 320. First distance 320 then is adjusted at step 610 to ensure that the user remains in focus if the user changes distance from web camera 310. The adjustment at step 610 may compensate for small movements of the user, such as rocking in the chair or leaning back in the chair. Then, an augmented reality focus system 335 is used as shown in step 612 to adjust the focal length of web camera 310 to the adjusted distance, so that user 104 remains in focus but background 205 (see FIG. 2) is blurred.

The skilled practitioner recognizes, in accordance with the embodiment set forth in FIG. 6, that distance 320, or d, may be found by calculating $d = v \times \Delta t$, wherein v is the velocity at which the signal travels (here, about $3.5 \times 10^2$ m/sec) and $\Delta t$ is the difference between the time sound 315 is made and the time at which the sound signal arrives at web camera microphone 325. Thus, $\Delta t$ equals the time of travel for the video signal plus the time of travel for the voice signal.

Thus, in embodiments of the disclosure, distance 320 may be calculated by distance measuring system 330 in computer 305 by measuring the time between a visual clue of the utterance of the sound and the arrival of the audio signal at web camera microphone 325 in computer 305. The time typically will be measured in milliseconds. Multiplication of the speed of sound by the time difference yields the distance 320.

As an example, if distance 320 is 0.8 m, sounds uttered by user 104 will be received at microphone 325 in about 2.3 ms. Thus, in some embodiments, distance measuring system 330 in computer 305 can calculate the distance 320 of user 104 from web camera 310.

In embodiments of the disclosure, distance 320, from user 104 to web camera 310, is a first distance. For the purposes of this disclosure, the terms focal length, focus depth, and depth of field shall be construed to have the same meaning, specifically, the distance from web camera 310 over which the subject is in focus. In embodiments of the disclosure, this first distance is a lower end of a range of focal lengths, focus depths, or depths of field that will portray user 104 in focus in the video image. Objects such as the background 205 that are further from the web camera than the focal length will be out of focus. In embodiments, a focal length equal to this first distance will display everything from the web camera to the face of user 104 in focus. The remainder of the image will be blurry.

In embodiments, typically, there will be nothing between user 104 and web camera 310. However, if user 104 holds something, such as an object for demonstration, the object will be in focus in front of user 104.

In embodiments of the disclosure, distance 320 may be considered a minimum focus length. Typically, however, a slightly longer focus length will provide a superior experience. For example, if distance 320 is determined and a focal length is fixed at the exact distance between web camera 310 and user 104, user 104 will go out of focus if the user moves away from the camera. Such movement might occur if user 104 shifts in or rocks the chair in which the user is sitting. This phenomenon may be dealt with in various ways.

In some embodiments, the focal length may be continuously calculated and then adjusted as user 104 moves within the web camera image. However, some users may find this effect disconcerting, as there will be brief moments when user 104 will be out of focus.

In other embodiments of the disclosure, the focal length may be established at a distance further than distance 320 from web camera 310. In these embodiments, movement of user 104 toward and away from the camera may be accommodated without requiring continuous re-focusing of the web camera. In these embodiments, a new focal length may be set at a fixed length above the minimum focal length. The new focal length may be between the shortest focal length, which is distance 320, and a second distance at which the background is in the image.

This second distance may be estimated, may be calculated by the web camera, or may be accommodated with a standard adjustment. For example, the user may estimate that the closest background is 0.6 m behind the user. In this embodiment, the second distance would be 0.6 m greater than the first distance. Then, the focal length would be set within the range of distance 320 plus 0.6 m. In other embodiments, the web camera may be used to measure a second distance, the distance between the background and the camera, by having the user stand in front of the closest background and use the web camera to measure the second distance, as was done with the first distance. The focal length then is set between the first distance and the second distance. In some embodiments, a standard adjustment may be made. For example, the user may decide to add 0.3 m to the minimum focal length. In particular, in an embodiment wherein the second distance is 0.6 m longer than the first distance, the focal length may be any length up to about 0.6 m longer than the first distance, and typically is about 0.1 m longer than the first distance, about 0.2 m longer than the first distance, about 0.3 m longer than the first distance, about 0.4 m longer than the first distance, or about 0.5 m longer than the first distance. Typically, the focal length will be selected to be closer to the first distance than to the second distance.

The focal length of the web camera cannot be adjusted because it has a fixed focus with a deep depth of field. The focal length and the aperture are inversely related. That is, smaller apertures provide longer focal lengths. In embodiments of the disclosure, software augmented reality focus system software 335 in computer 305 is used to provide an artificial aperture larger than the aperture of web camera 325. Application of a synthetic larger aperture shortens the apparent focal length of the web camera. In this way in such embodiments, the user will be in focus while the background is blurry. Thus, the video image is made clearer and appears less cluttered and confusing.

Augmented reality focus system 335 in computer 305 electronically generates an artificial aperture for web camera 310 using augmented reality to adjust the focus. As noted above, the depth of field or focal length is related to aperture by the relationship that a larger aperture produces a shorter depth of field. Thus, imposing or providing by an augmented reality focus system an artificially larger aperture than the web camera provides will shorten the focal length. Any suitable method of imposing an artificial aperture to shorten focal length may be used. Typically, software for use in augmented reality focus system 335 in computer 305 is available for this purpose.

FIG. 3 also illustrates an embodiment wherein image analysis and facial recognition analysis can be used to identify the face of user 104 and to use the distance from web camera 310 as the basis for selecting a focal length, as described above. Facial recognition software is available for use in computer 305 to establish the basis for selecting a focal length, as described above. Similarly, image analysis may be used to identify the most important feature in the image, user 104. As in the direct distance embodiments, the focal length, or depth of field, then is achieved by imposition of an artificial aperture.

FIG. 3 also illustrates another embodiment for capturing the sound portion of a video conference. As can be seen, user 104 utilizes headset 106 to enable the user to listen through earphones and speak through headset microphone 355. In some embodiments, microphone 355 may be on an arm extending to the user's mouth. In other embodiments, a microphone such as a lavalier microphone may be attached to the clothing near the mouth of user 104. Alternatively, user 104 may hold a microphone by hand. For convenience, any such microphone not part of web camera 310 will be referred to as "headset microphone 355." Use of earphones of headset 106 ensures privacy by eliminating the need to use speakers connected to computer 305 and limiting audible output from the computer to only user 104 using headset 106. Use of earphones 106 also reduces the sound level in the vicinity of computer 305 and user 104.

Similarly, use of a microphone reduces the amount of noise on the video conference by significantly reducing background noise. With a microphone, the microphone audio feed can be combined with video from web camera 310 to produce a web camera image with superior sound.

Background noise may tend to cause computer 305 to miscalculate distance 320 to yield a focal length too deep into the image. In embodiments of the disclosure in which background noise is significant, it is possible to introduce error if computer 305 confuses background sound with the visual clues from user 104. This error would cause insufficient blurring of the background. Therefore, the audio feed from the microphone, combined with visual clues from the video feed, may be used to calculate distance 320 and thence establish a focal length. However, in such embodiments, because the speed of signal of audio by wire from the microphone to computer 305 is about ⅔ the speed of light, use of the microphone signal to determine distance 320 requires more sophisticated measuring equipment and the likelihood of error is larger.

In an embodiment, it may be the case that headset microphone 355 may obscure the visual clues that would be used to calculate distance 320, especially if a microphone is large or is hand-held by the user. Also, user 104 may obscure the visual clues by putting a hand on or in front of the mouth, or by holding an object in front of the mouth. In that case, the web camera 310 may send a signal to alert user 104 that the focal length cannot be determined because the visual clues are not clear or are not visible to web camera 310. The alert serves to give the user the opportunity to ensure that the web camera 310 can obtain the visual clues necessary to calculate distance 320.

Figure 4:
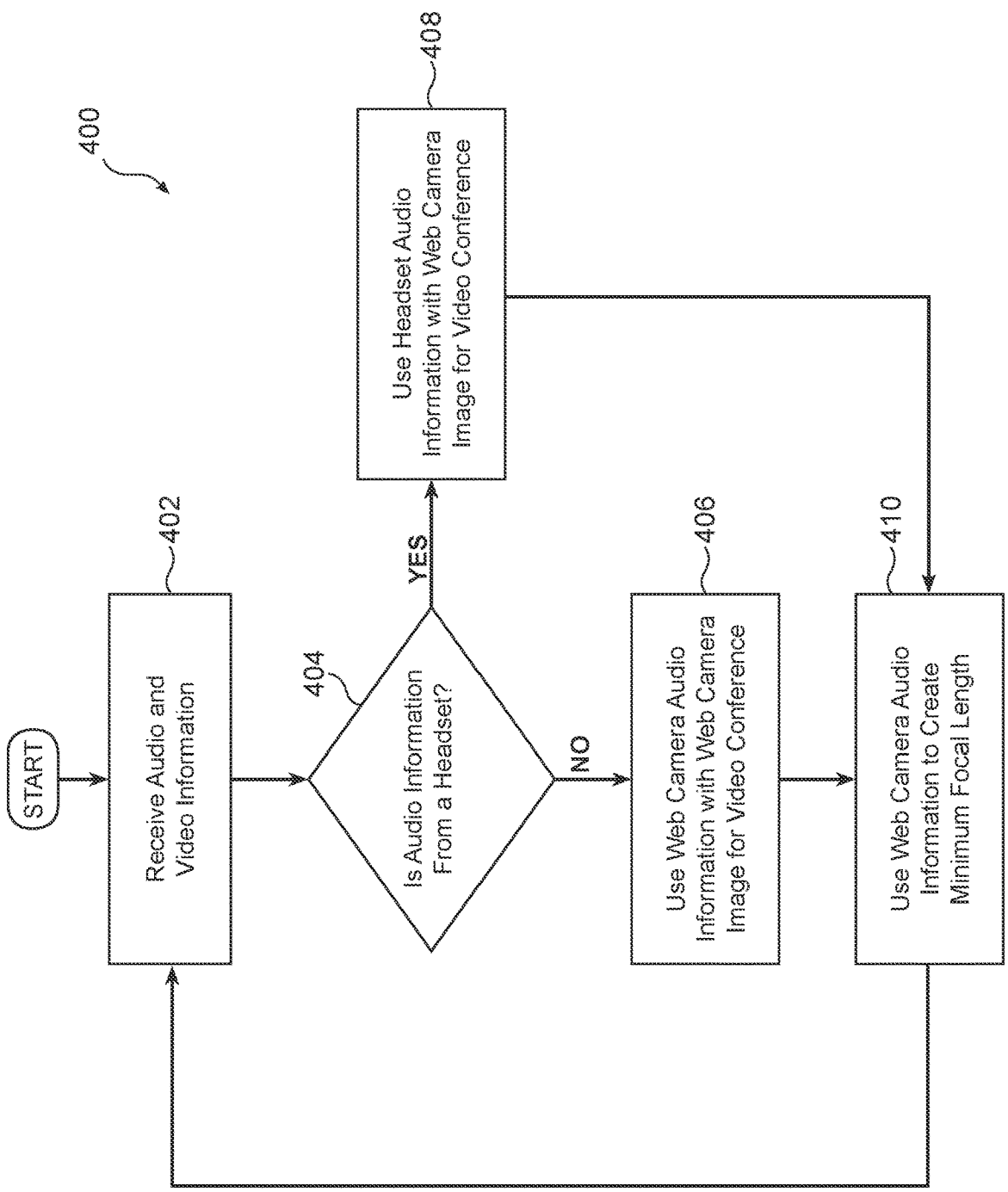
FIG. 4 is a flow chart of an embodiment of a method of the disclosure.

FIG. 4 illustrates an embodiment of a method used to calculate an appropriate focal length in distance measuring systems in accordance with embodiments of the disclosure. In accordance with method 400, computer 305 receives audio and video information at step 402. At step 404, computer 305 identifies whether the audio information is from a headset. This determination is straightforward, as the audio information is obtained from either headset microphone 355 or another microphone, such as a lavalier microphone, on headset 106 or microphone 325 on web camera 310.

As illustrated in the flowchart for method 400, audio information determined to be from headset microphone 355 is used with video information from web camera 310, as shown in step 408, to form the video conference image. If, at step 404, computer 305 determines that the audio information is not from headset microphone 355, step 406 shows that web camera audio will be used with web camera video to create the video conference image.

In embodiments of the disclosure, web camera audio information is used to determine the focal length, without regard to whether the audio is from a microphone or from the web camera, as shown at step 410. When the minimum focal length has been determined at step 410, the system for measuring first distance 320 returns to the beginning at step 402. Augmented reality focus system 335 adjusts the focal length by adding depth of field, as described above.

Embodiments of the system for creating a video conference display may further enhance usefulness by including in the display a background image. In other embodiments, the display may include an image controlled solely by user 104. An embodiment of the latter feature is illustrated in FIG. 6.

Figure 5:
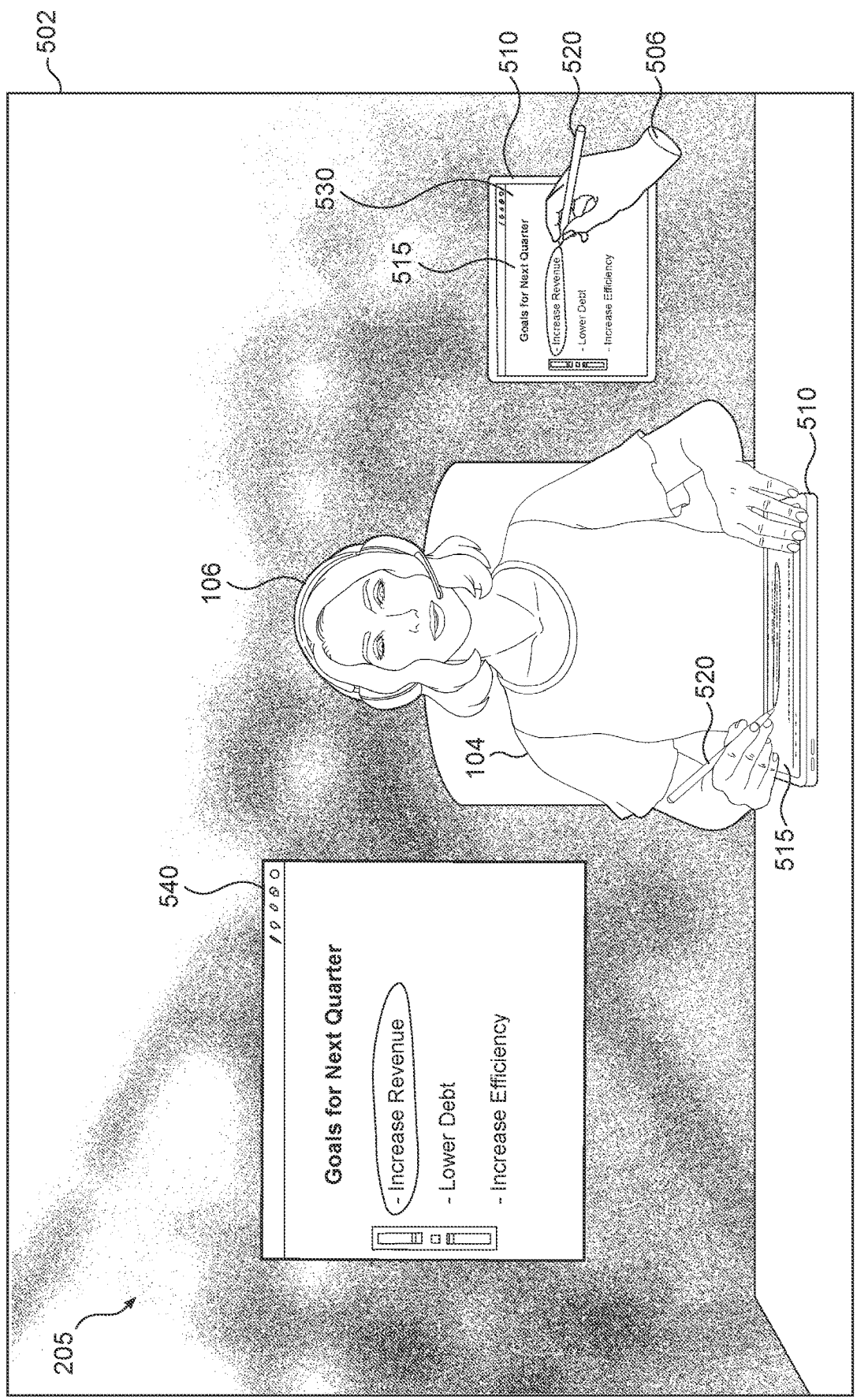
FIG. 5 illustrates a display of yet another embodiment of the disclosure.

As shown in FIG. 5, web camera image 502 shows user 104 using headset 106 in a video conference. In accordance with embodiments of the disclosure, background 205 is blurred. An electronic image-producing system 560 (see FIG. 3) is an additional feature in some embodiments that enables user 104 to provide additional information as part of the web camera image 502, illustrated as background image 540. Background image 540 is electronically inserted into blurred background 205 by the electronic image-producing system.

Electronic image-producing system 560 may include software (see FIG. 3) and may have additional features, as set forth below. In some embodiments, background image 540 produced by an electronic image-producing system may be an electronic display controlled by user 104. Background image 540 reproduces insert image 530 from tablet device 510. Tablet device 510 may be any electronic device that may be connected wirelessly or by wire with electronic image-producing system 560 in computer 305 to provide a display for background image 540. Web camera image 502 illustrates user 104 manipulating tablet 510 of electronic image-producing system 560 by writing on display 515 with writing implement 520, which also are parts of electronic image-producing system 560. In insert image 530, the disembodied hand 506 of user 104 marking image 515 on tablet 510 with writing implement 520. Insert image 530 is not part of the video conference image, but rather is an illustration of how background image 540 is produced.

The electronic image-producing system 560 is a system that generates images that can be changed during the video conference. Background image 540 may be a whiteboard in some embodiments. A whiteboard is a device that can be reversibly marked and then, in these embodiments, displayed as part of background image 540. In these embodiments, the whiteboard may be an electronically markable area. A whiteboard may be used only by user 104, or may be enabled for all participants to mark on it. A whiteboard may be markable in grayscale or in color, depending upon the electronic arrangement.

Background image 540 may be located anywhere in blurred background 205. In typical embodiments, background image 540 will be located so as not to block the view of user 104. In other embodiments, background image 540 may obscure user 104, and may be enlarged essentially to the size of the entire image.

Background image 540 is generated by computer 305 in accordance with commands given by user 104. Various computer programs are available to generate a background image.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A video system for creating a display in a video conference, the video system comprising:
   a web camera connected to a computer to capture an image of a user at a first distance from the web camera and a background that extends away from the web camera from a second distance greater than the first distance;
   a distance measuring system to measure the first distance between the user and the web camera; and
   an augmented reality focus system to establish an artificial focal length at least as long as the first distance and shorter than the second distance to artificially blur the background while maintaining the user in focus.

2. The video system of claim 1, wherein the distance measuring system includes a timer for determining the time between a visual clue that a sound has been uttered and the sound is received by a microphone on the web camera.

3. The video system of claim 1, wherein the distance measuring system comprises an image analysis system for facial recognition of the user.

4. The video system of claim 1, wherein the artificial focus length is at least about 0.1 m deeper than the first distance measured by the distance measuring system.

5. The video system of claim 1, wherein the artificial focal length is obtained by generating in the computer an artificial aperture for the web camera to yield a focal length and adding a fixed distance to make the focal length longer than the first distance but shorter than the second distance.

6. The video system of claim 1, wherein the video system uses microphone captured audio in combination with video captured by the web camera to generate a video conference image.

7. The video system of claim 1, further comprising a system for alerting the user that the user's image is out of focus.

8. A video system for creating a display in a video conference, the video system comprising:
   a web camera to capture an image of a user at a first distance from the web camera and a background that extends away from the web camera from a second distance greater than the first distance;
   a distance measuring system to measure the first distance between the user and the web camera;
   an augmented reality focus system to establish an artificial focal length at least as long as the first distance and shorter than the second distance to artificially blur the background while maintaining the user in focus; and
   an augmented reality electronic image display system for displaying on the video conference display information from an electronic device in electrical communication with the computer.

9. The video system of claim 8 wherein the distance measuring system includes a timer for determining the time between a visual clue that a sound has been uttered and the sound is received by a microphone on the web camera.

10. The video system of claim 8, wherein the distance measuring system comprises an image analysis system for facial recognition of the user.

11. The video system of claim 8, wherein the artificial focus length is at least about 0.1 m deeper than the first distance measured by the distance measuring system.

12. The video system of claim 8, wherein the electronic image display system displays a white board.

13. The video system of claim 8, wherein the electronic image display system displays an image from an electronic device electrically connected to the computer.

14. The video system of claim 8, further comprising a system for warning a user that the user's image is out of focus.

15. A method for introducing synthetic bokeh to blur a background of a video conference image from a web camera connected to a computer, the method comprising
   receiving audio and video information at a web camera;
   using the audio information from the web camera to establish a focal length at which to display an in-focus depiction of a user at a first distance from the web camera and a blurred background, wherein the focal length is determined by an augmented reality focus system and is at least the first distance from the web camera and less than a second distance to the background further from the web camera.

16. The method of claim 15, wherein the audio information from the web camera is used with the video information from the web camera.

17. The method of claim 15, further comprising capturing audio information with a microphone at the user's location and combining that audio information with the video information to create a video conference image.

18. The method of claim 15, wherein the time between a visual clue that a sound has been uttered and the sound is received by a microphone on the web camera is used to determine the first distance.

19. The method of claim 15, further comprising displaying on the video conference display information from an electronic device in electrical communication with the computer.

20. The method of claim 18, wherein a distance less than about 0.3 m is added to the first distance to determine the focal length.

\* \* \* \* \*